Fig. 1

July 16, 1963  A. L. DE JERSEY  3,097,588
MACHINES FOR THE COOKING OF PANCAKES AND LIKE HOT-PLATE GOODS
Filed Feb. 11, 1959  6 Sheets-Sheet 5

3,097,588
MACHINES FOR THE COOKING OF PANCAKES
AND LIKE HOT-PLATE GOODS
Arthur Leslie De Jersey, 20 Scheele St., Surrey Hills,
Victoria, Australia
Filed Feb. 11, 1959, Ser. No. 792,654
Claims priority, application Australia Feb. 20, 1958
35 Claims. (Cl. 99—353)

This invention relates to machines for cooking hot-plate goods, that is to say, goods such as pancakes, pikelets, scotch pancakes, drop-scones, and the like, which are cooked on hot-plates in the course of manufacture. Hereinafter, except where the term obviously has a narrow meaning, the term "pancakes" is used to denote any kind of hot-plate goods.

Machines of this kind generally embody endless conveyor apparatus in which transversely disposed cooking plates or hot-plates are moved endlessly (either intermittently or continuously) passed a batter-feeding station which deposits measured amounts of fluid or semi-fluid batter or dough mixture from a hopper or the like onto each hot-plate passing beneath the hopper so as to form a row of pancakes or the like on each successive hot-plate transversely thereof, the loaded hot-plates pass through a heating zone where said plates are heated by a mass of ignited gas jets or the like to cook the pancakes, and the cooked pancakes are stripped or otherwise removed from the hot-plates at the discharge end of the machine where the cooked pancakes are conveniently transferred to a cooling conveyor and finally discharged therefrom for packaging ready for distribution. The hot-plates advantageously are oiled, and, for this purpose, may pass an oiling station where oil is applied to the cooking surface of the hot-plates.

A defect of this form of apparatus is the necessity ordinarily to hand-turn the goods for cooking of the goods on both sides, otherwise the goods would leave the machine with their top face in a relatively uncooked condition. The present invention provides improvements in machines of the present kind whereby the goods are mechanically turned over in the course of cooking whilst traversing the length of the machine on the hot-plates so that both sides of the goods are effectively cooked by the hot-plates. The improvements of the present invention can be incorporated in any form of endless conveyor machines adaptable for the production of hot-plate goods.

In accordance with the present invention there is provided in a pancake cooking machine embodying a conveyor system which moves hot-plates on which quantities of pancake batter are deposited in transverse rows relative to the travel direction of the hot-plates for cooking the rows of deposited batter into pancakes and like hot-plate goods, the improvement wherein mechanism turns over the pancakes to cook both sides of said pancakes on the hot-plates, said mechanism comprising a battery of pancake slicing and lifting blades located transversely above the hot-plates at a suitable point intermediate the length of the conveyor system, and means operative to move said blades from an elevated neutral position and in a direction opposite to the travel direction of the hot-plates so that the blades descend and slicingly engage with the cooking face of the hot-plates so as to slice under the cooked underside of the pancakes on the hot-plates and return to the elevated neutral position in the course of which the blades turn over whereby the pancakes fall onto the hot-plates so that the uncooked side is in contact with the hot-plate for cooking of that side of the pancake, said means being operative to repeat the cycle of movements for each row of pancakes.

More particularly, the invention provides in a pancake cooking machine embodying a conveyor system which intermittently moves a series of hot-plates in side-by-side relationship and on each of the hot-plates quantities of pancake batter are deposited in a transverse row relative to the travel direction of the hot-plates for cooking each row of deposited batter into pancakes and like hot-plate goods, the improvement wherein mechanism turns over the pancakes to cook both sides of said pancakes on the hot-plates, said mechanism comprising a battery of pancake slicing and lifting blades located transversely above the hot-plates at a suitable point intermediate the length of the conveyor system, and means operative in timed relationship with the intermittent movement of each hot-plate to move said blades from an elevated neutral position and in a direction opposite to the travel direction of the hot-plates so that the blades descend and slicingly engage with the cooking face of each hot-plate so as to slice under the cooked underside of the pancakes on the hot-plate, thence rise to lift the pancakes clear of the hot-plate, thence turn over sidewards whereby the pancakes fall onto the hot-plate so that the uncooked side is in contact with the hot-plate for cooking of that side of the pancake, thence return to the elevated neutral position, said means being operative to repeat the cycle of movements coincidental with the intermittent movement of each successive hot-plate.

According to a practical embodiment of the invention there is provided a machine for cooking pancakes and like hot-plate goods, comprising a frame, an endless conveyor system supported by the frame and embodying an endless series of hot-plates in side-by-side relationship and forming upper and lower horizontal stretches, means operative to move the endless conveyor and hot-plates assembly intermittently, means for heating the hot-plates means located near the leading end of the endless conveyor and hot-plates assembly for depositing measured quantities of pancake batter on each hot-plate in a transverse row relative to the travel direction of the hot-plates, a travelling carriage embodying a battery of pancake slicing and lifting blades located transversely above the upper stretch of hot-plates at a suitable point intermediate the length of the endless conveyor and hot-plates assembly, and means operative in timed relationship with the intermittent movement of each hot-plate to move said travelling carriage and blades so that the blades descend from an elevated neutral position and in a direction opposite to the travel direction of the hot-plates and slicingly engage with the cooking face of each hot-plate so as to slice under the cooked underside of the pancakes on the hot-plate, thence rise to lift the pancakes clear of the hot-plate, thence turn over whereby the pancakes fall onto the hot plate so that the uncooked side is in contact with the hot-plate for cooking of that side of the pancake, the traveling carriage and blades thence returning to the elevated neutral position, said means being operative to repeat the cycle of movement coincidental with the intermittent movement of each successive hot-plate.

The travelling carriage and pancake slicing and lifting blades assembly and operating mechanism preferably comprises a transverse carriage member pivotally mounted for rocking movement on a pair of reciprocating slide-members supported at the sides of the machine frame, a row of blade members carried by a row of spindles mounted for axial reciprocal turning movement on the travelling carriage and disposed so that the blade members are located for slicing engagement with the hot-plates on the leading side of the travelling carriage, means for imparting rocking movement to the travelling carriage pivotally on the slide-members, means for imparting reciprocating movement to the slide-members supporting the travelling carriage, and means for imparting reciprocal turning movement to the row of spindles carrying the row of blade members, all in timed relationship as indicated herein.

Individual assemblies of lever and link mechanism mounted on the sides of the machine frame and coacting with cams carried by a common primary cam-shaft geared for rotation by a main drive shaft on the machine advantageously form the operating mechanism imparting the various movements to the travelling carriage and pancake slicing and lifting blades. Thus, the means for imparting rocking movement may comprise a slotted lever-arm, mounted on the machine frame for pivotal up-and-down movement by a bell-crank lever mounted on the machine frame and linked to the slotted lever-arm, the bell-crank lever having a tracking-roller which coacts with a carriage-rocking cam located at one side of the machine frame and fitted to the common primary cam-shaft geared for rotation by a main drive shaft on the machine, said travelling carriage having a tracking roller at one end fitted to slidingly traverse the slot of the slotted lever arm. Again, the means for imparting reciprocating movement to the pair of slide-members supporting the transverse carriage member may comprise a pair of lever arms pivotally mounted opposite each other on the sides of the machine frame for backwards-and-forwards pivotal movement and linked to the pair of slide-members, the lever arms having tracking-rollers which coact with a pair of carriage-reciprocating cams located at the sides of the machine frame and fitted to a common primary cam-shaft geared for rotation by a main drive shaft on the machine. Again, the means for imparting reciprocal turning movement to the row of spindles carrying the blade members may comprise a channel member carried by lever-arms mounted on the side of the machine frame for pivotal inwards-and-outwards movement, said lever arms having a tracking-roller which coacts with a blade-turning cam located at one side of the machine frame and fitted to a common primary cam-shaft geared for rotation by a main drive shaft on the machine, the travelling carriage having a reciprocating toothed rack engaging with toothed pinions carried by the spindles and said toothed rack having a roller tracking in the channel member.

Each said lever member carrying the tracking rollers conveniently is spring-loaded so that the said rollers are held in positive engagement with the coacting cams.

Cut-out mechanism can be provided operative to prevent rocking movement of the travelling carriage and reciprocal turning movement of the spindles carrying the slicing and lifting blade members, in case a fault develops in the operation of the machine or should an adjustment be necessary. This mechanism may comprise pivoted lever and link means mounted on the machine frame and operated by a hand lever pivotally mounted on one side of the machine frame to upstand for operation, the lever and link means being disposed between the upper and lower stretches of the hot-plates and connected to engage with and cutout the means imparting rocking movement to the travelling carriage and to engage with and cut out the means imparting reciprocal turning movement to the spindles carrying the blade members.

The machine of the invention preferably also is provided with pancake discharge mechanism near the discharge end of the endless conveyor system for discharge of the pancakes from said machine. This mechanism may comprise a battery of pancake slicing and lifting blades located transversely above the hot-plates near the discharge end of the endless conveyor and hot-plates assembly, and means operative in timed relationship with the intermittent movement of each hot-plate to move said blades from a neutral position and in a direction opposite to the travel direction of said hot-plates so as to slice under the cooked pancakes thence turn over backwards whilst returning to the neutral position so as to lift the pancakes clear of the hot-plates and discharge them from the machine, said means being operative to repeat these movements coincidental with the intermittent movement of each successive hot-plate.

More particularly, the pancake discharge mechanism may comprise a row of blade members fixed to a travelling transverse shaft located above the upper stretch of hot-plates near the discharge end of the machine, means for imparting reciprocating movement to the assembly of blade members and transverse shaft, and means for imparting axial reciprocal turning movement to the shaft, both in timed relationship as indicated. The operating mechanism for imparting the movements to the travelling transverse shaft and blade members can comprise individual assemblies of lever and link means mounted at the discharge end of the machine and coacting with cams carried by a common secondary camshaft geared for rotation by the machine drive means. Thus, the travelling transverse shaft can be carried by a pair of bearing members slidably fitted to a pair of slide-blocks disposed opposite each other on the sides of the machine frame, said means imparting reciprocating movement to the assembly of blade members and transverse shaft preferably comprising a pair of lever arms mounted on the machine frame for pivotal backwards-and-forwards movement and linked to the bearing members and having a tracking roller which coacts with a shaft-reciprocating cam located at the discharge end of the machine frame and fitted to the common secondary cam shaft geared for rotation by the machine drive means, whilst the means for imparting axial reciprocal turning movement to the shaft preferably comprises a reciprocating toothed rack fitted to one of the slide-blocks and housed by one of the bearing members for sliding movement through the bearing housing, said transverse shaft having a toothed pinion coacting with the reciprocating rack for reciprocal axial turning of the shaft, and a pair of lever arms mounted on the machine frame for pivoted backwards-and-forwards movement and having a tracking roller which coacts with a rack-reciprocating cam located at the discharge end of the machine frame and fitted to the common secondary cam-shaft geared for rotation by the machine drive means.. Each said lever member carrying the tracking rollers can be spring-loaded so that the said rollers are held in positive engagement with the coating cams.

In the machine according to the practical embodiment, there is also advantageously provided hot-plate cleaning and oiling mechanism disposed with relation to the cooking face of the hot-plates to clean debris from the cooking face of the hot-plates and apply and spread oil across each cooking face ready for deposit of measured quantities of pancake batter on each hot-plate. The hot-plate cleaning and oiling mechanism conveniently is located beneath the endless conveyor and hot-plates assembly for engagement with the cooking face of the hot-plates in the lower horizontal stretch, and may comprise a transversely disposed rotary brush adapted to rotate in a direction linearly opposite to the travel direction of the hot-plates or cleaning debris from each hot-plate, a strip-form rotary brush adapted to contact and apply oil to each hot-plate, a bank of spring-loaded rotary brushes in staggered relationship and with the brush diameters overlapping for spreading the oil across the cooking face of each hot-plate, and means for rotating said brushes.

The strip-form brush can be mounted for rotation in a trough forming a cooking-oil reservoir and supported on the machine frame so as to be raised or lowered to vary the length of the brush contact with the hot-plates, hand operative means being provided for raising or lowering said trough for the purpose; for example, the trough can be carried by a lever pivotally mounted on the machine frame, said lever being actuated by hand-lever and cam means mounted on the machine frame to raise or lower said trough. The bank of spring-loaded rotary brushes can be carried by a suspension beam mounted on the machine frame so as to be raised or lowered to vary the brush-pressure on the hot-plates, hand-operative means being provided for raising or lowering said beam for the purpose; for example, the suspension beam can have a pair of slide-plates at the ends slidably fitted to a pair of slide-blocks mounted on the sides of the machine frame, a pair of levers pivotally mounted on the sides of the machine frame being linked to the slide-plates, and said levers being actuated by hand-lever and cam means mounted on the machine frame to raise or lower said beam.

In order, however, that the invention may be fully understood, reference is made to the accompanying drawings, which form part of the specification and in which:

FIG. 4 is a detail plan view taken at lines 4—4 of FIG. 3;

Referring to the drawings, the machine frame comprises two pairs of pedestal supports 1 and 2 forming the leading and discharge ends respectively of the machine, connected together in longitudinal spaced relationship by a pair of longitudinal beams 3, pairs of cross bars connecting the pedestals together in transverse spaced relationship.

Figure 1:
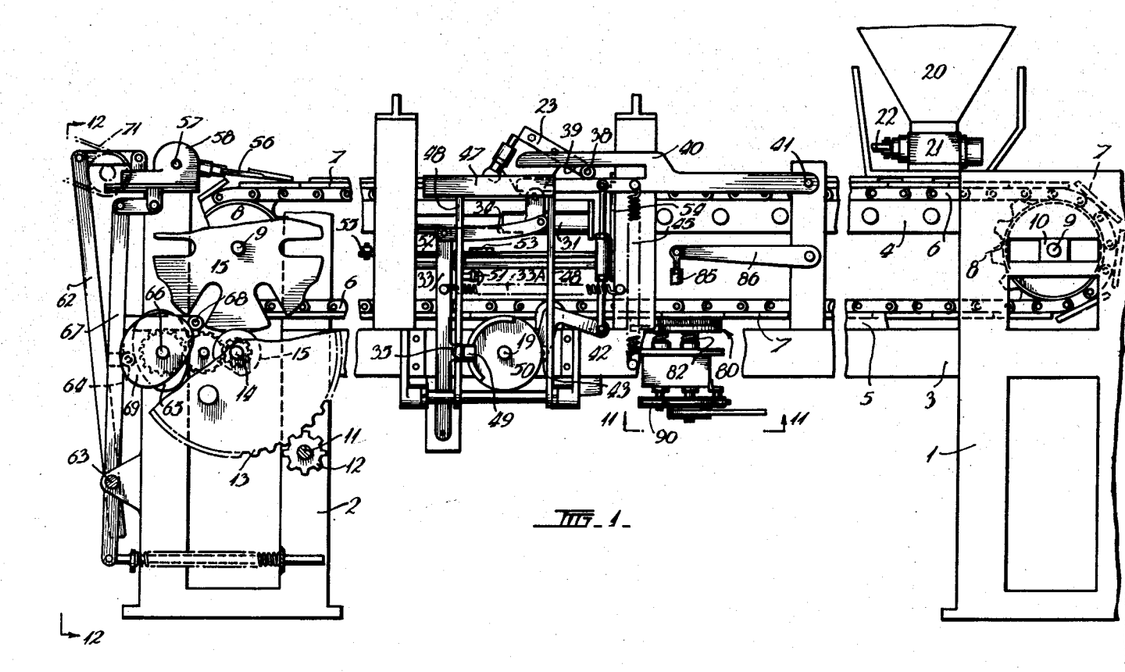
FIG. 1 is a side elevational view taken from one side of a pancake cooking machine in accordance with a preferred practical embodiment of the invention.
Figure 2:
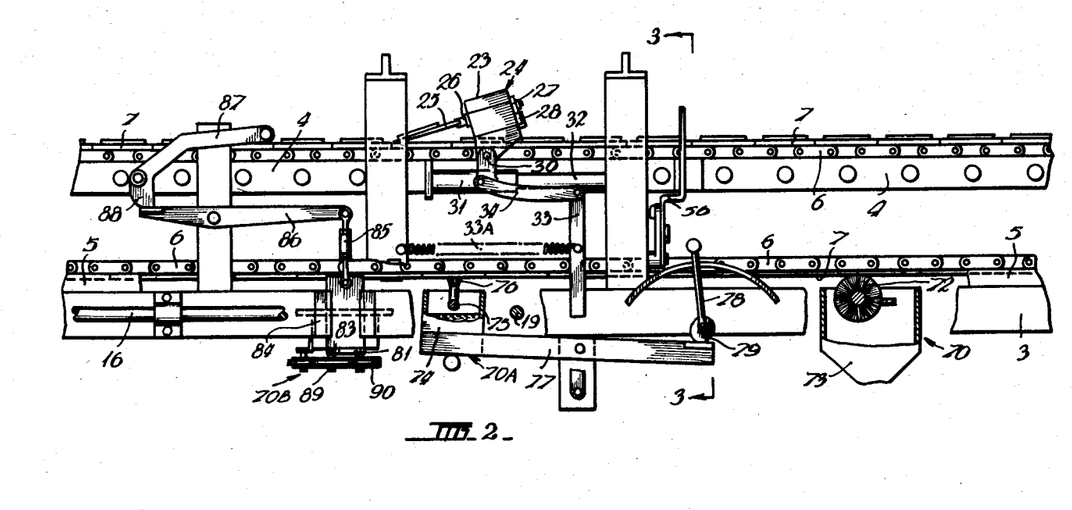
FIG. 2 is a side elevational view of the central part of the machine seen in FIG. 1 but taken from the opposite side.
Figure 3:
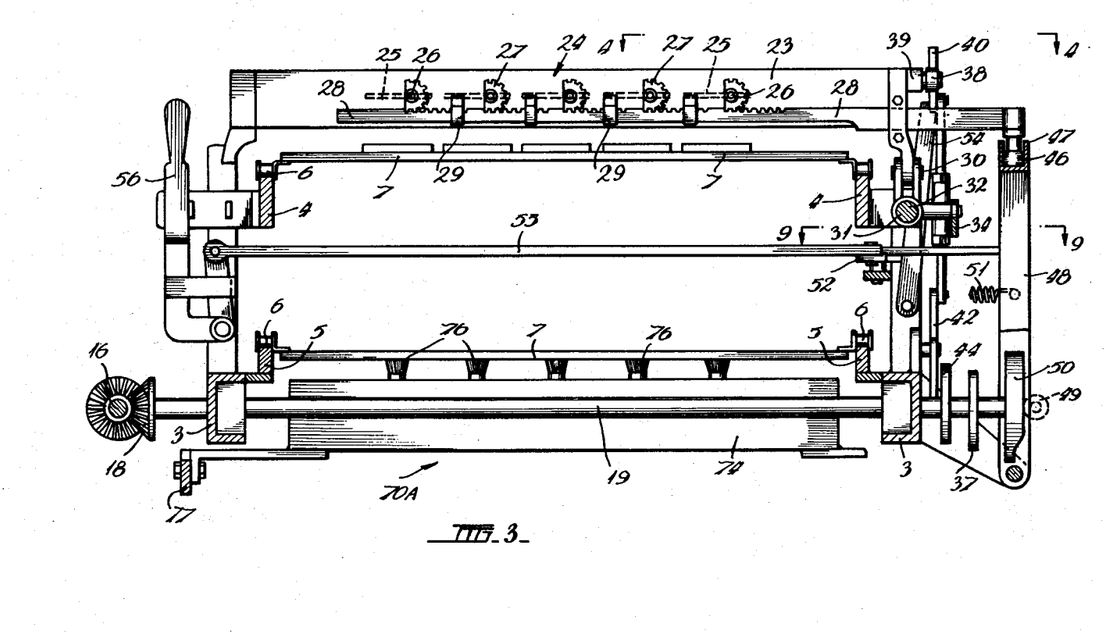
FIG. 3 is an enlarged cross sectional view taken at lines 3—3 of FIG. 2.

Connected to the inner faces of the pedestals 1 and 2 at both ends of the machine is a pair of upper and lower conveyor-chain guide-rails 4 and 5 respectively, on both sides of the machine. A pair of endless conveyor chains 6, having upper and lower horizontal stretches, track on said pairs of upper and lower conveyor-chain guide-rails 4 and 5, said chains being moved so that the upper stretch moves from right to left read against FIG. 1. Hot-plates 7, in side by side relationship and extending transversely of the machine are suitably connected at their ends to the conveyor chains 6. The conveyor chains extend around sprocket wheels 8 at the leading and discharge ends of the machine, the shafts 9 of the sprocket wheels 8 being mounted in bearings 10 in said pedestals 1 and 2. The sprocket wheels 8 can be driven by an electric motor or other suitable means mounted on a subframe at the discharge end of the machine, the electric motor chain-driving a sprocket wheel mounted on a shaft 11 extending between the pedestals 2 at the discharge end of the machine. This shaft 11 carries a toothed pinion 12 which engages with a spur wheel 13 carried by a main transverse drive shaft 14 which in turn engages with a toothed pinion on the shaft of the sprocket wheels driving the endless conveyor chains 6. The main transverse drive shaft 14 carries a Geneva-stop wheel arrangement 15 which imparts intermittent motion to the shaft 9 carrying the conveyor chain sprocket wheels 8.

A main longitudinal drive shaft 16 is mounted on bearings extending from one side of the machine frame and is driven by the main tranverse drive shaft 14 through bevel gears 17, said longitudinal drive shaft 16 also carrying bevel gearing 18 for driving a common primary camshaft 19 which operates mechanism to move the travelling carriage and slicing blades as well as the pancake batter measuring and depositing mechanism as hereinafter described.

The hot-plates 7 can be heated by banks of ignited gas jets impinging on the undersurface of the upper stretch of hot-plates, the gas being conveyed to the jets by pipes from a gas main at one side of the machine.

Pancake batter measuring and depositing mechanism is located at the leading end of the machine and comprises an overhead hopper 20 with valve assembly 21 located at the leading end of the machine. Said valve assembly consists of a battery of measuring and discharge valves adapted to deposit a row of measured amounts of pancake batter from the hopper 20 onto each hot-plate 7 as the hot-plates reach the upper horizontal stretch at the leading end of the machine and in passing beneath the hopper 20, means being provided for operating the battery of measuring and discharge valves in timed relationship with the intermittent movement of the hot-plates so as to deposit the pancake batter on each hot-plate 7 when stationary.

Batter in the hopper is drawn through outlet ports in the hopper into a series of chambers in the valve assembly by means of outward movement of plungers 22 drawn by links which are actuated through lever arms co-acting with cams on a drive shaft bevel geared to the main longitudinal drive shaft 16. During the filling of each chamber, the valves are open to inward flow but closed to discharge. After the filling of the chambers the valves are turned to bring inlet ports of the valves out of register with the outlet ports of the hopper 20 and to bring discharge ports of the valves into register with discharge ports of the chambers. Turning of the valves is effected by lever and link means operated by the cams on the drive shaft geared to the main longitudinal drive shaft 16. When the chambers have been filled and the valves turned to the discharge position, the plungers are then moved inwards and force the pancake batter from the chambers through the discharge ports so that the batter is deposited onto the hot-plate immediately positioned beneath. The quantity of pancake batter fed to the hot-plates can be varied by adjusting the outward stroke of the plungers by means of a screw-adjusted stop, a compression spring being provided to compensate the movement of the links operating them.

About midway the length of the machine is located the travelling carriage and pancake slicing and lifting blades assembly for turning the pancakes when in a semi-cooked condition so as to cook both sides of the pancakes. The travelling carriage 23 of this assembly conveniently is a transverse tubular member and supports the battery of pancake slicing and lifting blades 24 so that the blade members 25 are on the leading side of the carriage. Each blade member 25 is attached to a spindle 26 mounted so to extend through the transverse tubular member for reciprocal axial turning movement. Each spindle 26 carries a toothed pinion 27 on the trailing or discharge side of the carriage, said pinions engaging with a toothed rack 28 supported by brackets 29 for reciprocal sliding movement against the side of the carriage. Said travelling carriage 23 is mounted on pivots 30 at its ends so as to be connected to a pair of reciprocating slide-members 31 which conveniently consist of tubular members slidingly fitted to a pair of slide rails 32 mounted on the sides of the machine frame.

Means for reciprocating the slide members 31 and thus the carriage 23 consists of a pair of levers 33 pivotally mounted at their lower ends to the sides of the machine frame and having a pair of links 34 at their upper ends connected to the pair of tubular slide members 31, one of the levers 33 having an intermediate arm 35 carrying a tracking roller 36 which engages with a carriage-reciprocating cam 37, the lever arm 35 being spring loaded by coiled tension spring 33A so that the tracking roller 36 is held in positive engagement with the cam 37. Said cam 37 is carried by the common primary cam-shaft 19 bevel geared to the main longitudinal drive shaft 16 at one side of the machine, for rotation and actuation of the lever arrangement.

Rocking of the travelling carriage 23 on the slide members 31 is effected by tracking roller 38 on arm 39 of the carriage 23 engaging and traversing the slot of slotted lever 40 pivotally mounted at 41 on one side of the machine frame, the slotted lever 40 being moved up and down by bell-crank lever 42 mounted on the machine frame and linked at one end to the slotted lever 40. The opposite end of the bell-crank lever 42 has a tracking roller 43 coacting with a carriage-rocking cam 44 on the common primary cam shaft 19. The slotted lever 40 is spring-loaded by coiled tension spring 45 attached to the machine frame so that the tracking roller 43 is held in positive engagement with cam 44.

Reciprocal axial turning movement is imparted to the spindles 26, through reciprocation of the rack 28 which actuates the assembly of pinions 27, by locating tracking roller 46 at the end of rack 28, in channel member 47, which is moved inwards and outwards from the side of the machine. Tracking roller 46 is adapted to slide lengthwise of the channel member 47 when the travelling carriage is being reciprocated and rocked. The channel member 47 is mounted at the top of a pair of supporting arms 48 which move pivotally inwards and outwards about shaft 49 at their lower end, said shaft 49 being attached to the side of the machine. One of the supporting arms 48 has a tracking roller 49 for engagement with a blade-turning cam so as to move the channel member 47 inwardly and outwardly and thereby reciprocate the rack 28, cam 50 being on primary cam-shaft 19. The arms 48 are spring loaded by coiled tension spring 51 to maintain the tracking roller 49 in positive engagement with the cam 50.

Figures 5, 6:
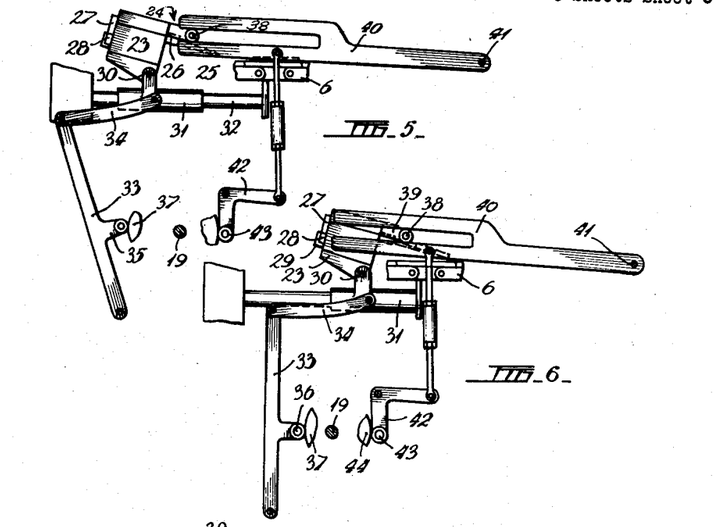
FIGS. 5, 6, 7 and 8 are semi-diagrammatic side elevational views showing the travelling carriage and battery of pancake slicing and lifting blades and the operating mechanism in various phases of movement in the course of said mechanism imparting the rocking movement and reciprocating movement to the travelling carriage.
Figures 7, 8:
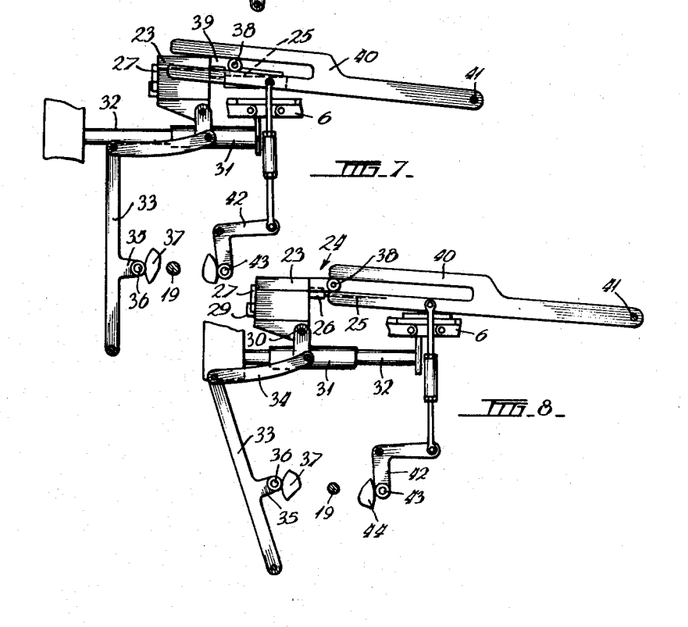
Figure 8:
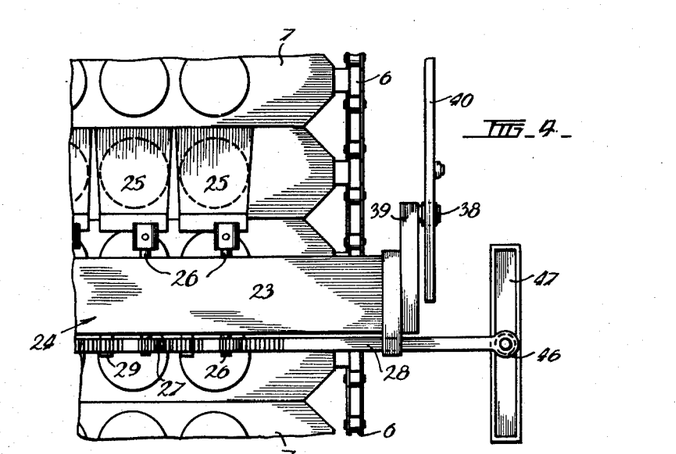
Figure 9:
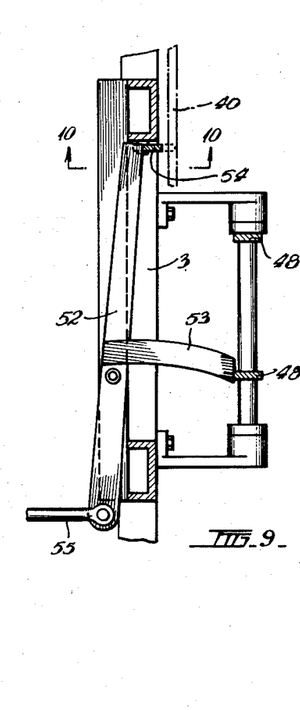
FIG. 9 is a detail plan view taken at lines 9—9 of FIG. 3.
Figures 10, 11:
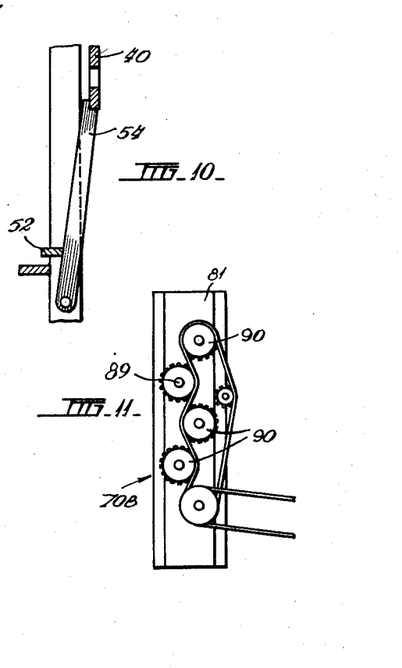
FIG. 10 is a detail cross-sectional elevational view taken at lines 10—10 of FIG. 9.
FIG. 11 is a detail inverted plan view taken at line 11—11 of FIG. 1.
Figures 12, 13, 14:
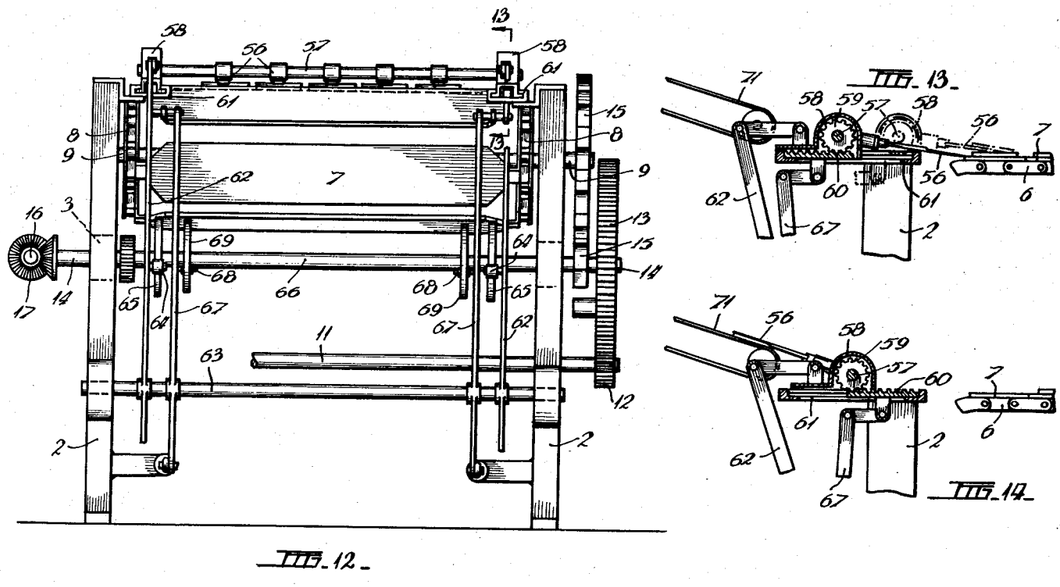
FIG. 12 is an end-elevational view taken at lines 12—12 of FIG. 1 and shows the discharge end of the machine.
FIG. 13 is a cross sectional detail view taken at lines 13—13 of FIG. 12, showing diagrammatically the movements of certain of the pancake-discharge mechanism, the battery of pancake slicing and lifting blades being in the slicing or forward position.
FIG. 14 is a view similar to FIG. 13 but showing the battery of pancake slicing and lifting blades in the lifting or retracted position.

Timing of the various movements of the assembly consisting of travelling carriage and battery of pancake slicing and lifting blades is as follows: When the travelling carriage 23 is in the elevated neutral or fully retracted position (which position is shown diagrammatically as FIG. 8), the channel member 47, which reciprocates the rack 28, is extended fully outwards from the side of the machine, and the slotted lever 40, which rocks the travelling carriage 23, is in an upper position. The slotted lever 40 is then caused to move downwardly thus rocking the travelling carriage 23 forwards about the pivots 30 on the reciprocating slide-members 31 and causing the blades 25 to dip downwards to the hot-plates. When the slotted lever 40 reaches its lower position (which position is shown diagrammatically at FIG. 6), the travelling carriage 23 moves forward on the slide rails 32 in a travel direction opposite to the travel direction of the hot-plates 7, that is to say, from left to right with respect to the illustrations shown as FIGS. 5 to 8, so that the blades 25 slicingly engage with one of the hot-plates which are in the stationary position in the course of the intermittent movement of the hot-plates. At this point the slotted lever arm 40 is operated to move upwardly, which rocks the carriage 23 backwards so as to lift the blades 25. Simultaneously with this, the rack 28 moved inwards thus turning the spindles 26 and correspondingly sidewardly turning the blades 25 whereby the pancakes are turned over and fall so as to deposit on the hot-plate therebeneath with the uncooked side in contact with the cooking face of the hot-plate, whilst the hot-plates are stationary. The travelling carriage 23 is then returned to the elevated neutral or retracted position, at which point channel member 47 of the mechanism operating the rack 28 moves outwards to turn the blades 25 so that they are in their original or neutral position ready to dip for slicing engagement with the cooking face of the next hot-plate.

Means for cutting-out the rocking of the travelling carriage 23 and the turning of the blades 25 consists of a horizontally-disposed pusher lever 52 pivotally mounted on the machine frame and having a side arm 53 intermediate its length for engaging with one of the arms 48 supporting the channel member 47, said pusher lever 52 also engaging at one end with a vertically-disposed bar 54 pivotally mounted on the machine frame to move said bar 54 into engagement with the slotted lever 40. The opposite end of the horizontally-disposed pusher lever 52 is connected to a transverse link-bar 55 extending between the upper and lower horizontal stretches and connected to a hand lever 56 pivotally mounted on the machine frame. This lever and link arrangement is mounted on the machine frame so as to be disposed between the upper and lower horizontal stretches of the hot-plates and engages with the slotted lever 40 and with one of the arms 48 supporting the channel member so as to counter the return springs 45 and 51 and withhold the tracking rollers 43 and 49 respectively from coacting with the cams 44 and 50. Thus, the slotted lever 40 for rocking the travelling carriage 23 is held in an upper position, whilst the channel member 47 is held fully extended to the side of the machine frame.

Near the trailing end of the machine is located the pancake discharge mechanism which slices under the cooked pancakes on each hot-plate and discharges the pancakes from the machine. This mechanism consists of a battery of pancake slicing and lifting blades 56 carried by a travelling transverse member 57, which conveniently is of shaft-form, adapted to direct the blades 56 into slicing engagement with the cooking face of each hot-plate 7 whilst the hot-plates are in the stationary position in the course of their intermittent movement. The blades 56 are moved to travel in a direction opposite to the travel direction of the hot-plates and are also moved in an arc about the axis of the transverse shaft 57 so as to dip and contact the cooking face of the hot-plates for slicing under the cooked pancakes, thence reverse this movement so as to turn over backwards, that is to say, in a direction in line with the travel direction of the hot-plates, whilst retracting to a neutral position. In this way the cooked pancakes are lifted from the hot-plates 7 and discharged from the machine. The cycle of movements is repeated for each successive hot-plate in timed relationship coincidental with the hot-plate being in a stationary position in the course of the intermittent movement of the hot-plates.

The travelling transverse shaft 57 is supported by a pair of reciprocating bearing-housings 58, at least one of which houses a toothed pinion 59 on the shaft 57, said pinion 59 coacting with a travelling toothed-rack 60 likewise housed by the bearing-housing, which bearing is constructed to allow reciprocal sliding movement of the rack 60 therethrough. The assembly of bearing-housings and travelling rack moves slidingly backwards and forwards in a pair of slide-blocks 61 mounted on the top of the pedestals 2 at the discharge end of the machine. The arrangement is such that the assembly of travelling transverse shaft 57 with pinion 59, bearing-housings 58, and travelling rack 60, is moved slidingly in the slide-blocks 61 initially in a direction opposite to the travel direction of the hot-plate 7, the blades 56 being downwardly inclined and engaging with the cooking face of a hot-plate so as to slice under cooked pancakes on the hot-plate. Upon the assembly reaching the full extent of this travel movement, the rack 60 is retained in that position for a time, but, the bearing-housings and shaft assembly is retracted, this retraction causing the pinion 59 on shaft 57 to coact with the retained rack 60 and thus turn the shaft 57. This causes the blades 56 to move in an arc about the axis of the shaft 57 and lift the pancakes clear of the hot-plates so as to deposit the pancakes on a secondary endless conveyor 71 for cooling and delivery to a point ready for packing into a condition for distribution. The rack 60 is then retracted as a result of which the pinion 59 on shaft 57 coacts to reverse the turning movement axially of the shaft 57 and thus returning the blades 56 into their downwardly inclined position ready for slicing engagement with the next hot-plate, and this cycle of movements repeated as indicated.

Mechanism for effecting movement of the assembly of transverse shaft 57 with pinion 59, bearing-housings 58, and travelling rack 60, as indicated above, consists of a pair of springloaded lever arms 62 mounted on a rocker shaft 63 extending between the pedestals 2 at the discharge end of the frame, a tracking roller 64 carried by one of the lever arms 62 co-acting with a shaft-reciprocating cam 65 on a secondary common cam shaft 66 mounted on and extending between the pedestals 2 at the discharge end of the machine, the cam shaft 66 being driven by a chain of gears operated by the main transverse drive shaft 14. Said rocker shaft 63 has another spring-loaded lever arm 67 which carries a tracking roller 68 for co-acting with a rack-reciprocating cam 69 on the secondary common cam shaft 66 for reciprocating the rack. Cams 65 and 69 are so shaped and arranged as to effect reciprocal sliding movement of the transverse shaft assembly and rack in timed relationship, as indicated.

The secondary endless conveyor 61, on to which the cooked pancakes are delivered conveniently consists of canvas belting to allow the cooked pancakes to cool ready for transfer to other conveyors which transport the cooked pancakes to a packing point.

After progressively discharging the cooked pancakes from the machine, the hotplates are cleaned and oiled ready for depositing measured quantities of pancake batter in rows on each hotplate as before. Mechanism for this purpose is mounted beneath the lower horizontal stretch of the hot-plates and is disposed intermediate the length of the conveyor system, said mechanism comprising a cleaning brush means 70 to wipe debris from the hot-plates, oil applicator means 70A for applying oil to the hot-plates after cleaning, and oil spreading means 70B for spreading oil across the cooking face of the hot-plates.

The cleaning brush means 70 consists of a transversely disposed rotary brush 72 driven to rotate in a direction linearly opposite to the travel direction of the hot-plates 7 for cleaning debris from the hot-plates, a receptacle 73 collecting the debris. The oil applicator means 70A for applying oil to the hot-plates after cleaning consists of a trough 74 containing liquid cooking fat or other oily substance embodying a shaft 75 adapted to be chain driven through a sprocket chain arrangement mounted on the primary common cam shaft 19, said shaft having a strip-form brush 76 which is arranged to contact and apply the liquid fat to each hot-plate per revolution of the shaft 75. The trough 74 is carried by a pivoted lever 77 supported by the machine frame, said lever being moved by hand lever 78 having an actuating cam 79 so as to provide for adjustment of the height of the trough and thereby regulate the amount of oil applied to the hot-plates, or, cut out application of oil altogether.

The oil spreading means 70B for spreading oil across the cooking face of the hot-plates consists of a bank of rotary brushes 80 in staggered relationship, with the brush diameters overlapping, supported by a suspension beam 81 mounted on the machine frame for vertical adjustment and having means for raising and lowering the suspension beam so as to adjust the degree of engagement of the brushes with the cooking face of the hot-plates. Said brushes 80 have spring-loading 82 to maintain them in contact with the cooking face of the hot-plates when in use. The suspension beam 81 has slide-plates 83 at each end for sliding in a pair of slide-blocks 84 fixed to the machine frame, the slide-plates 83 being connected by way of an adjustment link 85 to a lever arm 86 pivotally mounted on the machine frame. An operating hand-lever 87 with a cam-face 88 is pivotally mounted on the machine frame at one side, the cam-face 88 of the hand-lever 87 engaging with the pivoted lever arm 86 to move said lever-arm pivotally whereby the assembly of slide-plates and suspension beam is raised or lowered. The spring-loaded rotary brushes are held by spindles 89 extending through bearings in the suspension beam 81 and are rotated by belt-driven pulleys 90 on the lower ends of the spindles, an auxiliary electric motor driving the belting around said pulleys 90.

In operation, motor means driving the machine and associated mechanism is set in operation so that the hot-plates 7 are thoroughly cleaned and oiled ready for depositing of the pancake batter on the hot-plates, and, the gas-jets heating the hot-plates ignited for the purpose, the hopper 20 being charged with the pancake batter. The valve mechanism 21 is then brought into operation so that measured quantities of batter are deposited in a row on each hot-plate when stationary and positioned beneath the valves, in the course of the intermittent movement of said hot-plates.

The rows of pancake batter deposited on the heated travelling hot-plates, cook on the underside in the course of moving to the battery of pancake slicing and lifting blades 24, whereupon the semi-cooked pancakes on each hot-plate are slicingly lifted therefrom and turned over as described, so as to cook the other or uncooked side. The cooking pancakes then progressively travel to the discharge end of the machine, by which time they are cooked on both sides, where they are slicingly lifted from the hot-plates 7 as described and transferred to the secondary endless conveyor 71 for delivery to a packing point as described.

I claim:

1. A machine for cooking pancakes and like hot-plate goods, comprising in combination an endless conveyor system supported by a frame and embodying an endless series of hot-plates in side-by-side relationship and disposed to form upper and lower substantially horizontal stretches of hot-plates; means operative to move the endless conveyor and hot-plates assembly intermittently; means for heating the hot-plates; means located near the leading end of the endless conveyor and hot-plates assembly to deposit measured quantities of pancake batter on each hot-plate in a transverse row relative to the travel direction of the hot-plates; pancake-turnover means comprising a travelling carriage located transversely above the upper stretch of hot-plates at a suitable point intermediate the length of the endless conveyor and hot-plates assembly and mounted pivotally to rock on a pair of reciprocating slide-members supported at the sides of the machine frame, a transverse battery of pancake-turnover slicing and lifting blades supported by said carriage and disposed to face said leading end of the endless conveyor and comprising a row of blade members carried by a row of spindles mounted for axial reciprocal turning movement on the transverse carriage member, and operative means comprising means for imparting rocking movement to said transverse carriage member, means for imparting reciprocating movement to said slide-members, and means for imparting reciprocal turning movement to each of the spindles carrying the row of blade members, all operative in timed relationship with the intermittent movement of each hot-plate to move said travelling carriage and blades from an elevated neutral position and in a direction opposite to the travel direction of the hot-plates and lower said blades into slicing engagement with a hotplate located immediately beneath said blades in said lowered position and load the partly cooked pancakes from said hot-plate onto said blades, thence raise said blades, thence retract the travelling carriage and turn the blades over sidewardly to deposit the pancakes with the uncooked side downwards on said hot-plate and return said travelling carriage and blades to the elevated neutral position, said pancake-turnover operative means being operative to repeat the cycle of movements coincidental with the intermittent movement of each successive hot-plate; and pancake discharge means located near the trailing end of the endless conveyor and hot-plate assembly to slicingly separate from the hot-plates the cooked pancakes approaching the trailing end of the endless conveyor and hot-plates assembly and discharge said pancakes from the machine.

2. A machine as defined in claim 1, in combination with cut-out means operative to prevent rocking movement of the transverse carriage member and reciprocal turning movement of the spindles carrying the pancake slicing and lifting blade members.

3. A machine as defined in claim 1, in which the means for imparting rocking movement to said transverse carriage member comprises a slotted lever-arm mounted on the machine frame for pivotal up-and-down movement by a bell-crank lever mounted on the machine frame and linked to the slotted lever-arm, the bell-crank lever having a tracking-roller which coacts with a carriage-rocking cam located at one side of the machine frame and fitted to a common primary cam-shaft geared for rotation by a main drive shaft on the machine, said transverse carriage member having a tracking roller at one end fitted to slidingly traverse the slot of the slotted lever arm.

4. A machine as defined in claim 1, in which the means for imparting reciprocating movement to the pair of slide-members comprises a pair of lever arms pivotally mounted opposite each other on the sides of the machine frame for backwards-and-forwards pivotal movement and linked to the pair of slide-members, the lever arms having tracking-rollers which coact with a pair of carriage-reciprocating cams located at the sides of the machine frame and fitted to a common primary cam-shaft geared for rotation by a main drive shaft on the machine.

5. A machine as defined in claim 1, in which the means for imparting reciprocal turning movement to each of the spindles carrying the blade members comprises a channel member carried by lever arms mounted on the side of the machine frame for pivotal inwards-and-outwards movement, said lever arms having a tracking roller which coacts with a blade-turning cam located at one side of the machine frame and fitted to a common primary cam-shaft geared for rotation by a main drive shaft on the machine, the transverse carriage member having a reciprocating toothed rack engaging with toothed pinions carried by said spindles and said toothed rack having a roller tracking in said channel member.

6. A machine as defined in claim 1, in which the operative means imparting the various movements to the travelling carriage and pancake slicing and lifting blades comprises individual assemblies of lever and link mechanism mounted on the sides of the machine frame to coact with cams carried by a common primary cam-shaft geared for rotation by a main drive shaft on the machine; the means for imparting rocking movement to said transverse carriage member comprises a slotted lever-arm mounted on the machine frame for pivotal up-and-down movement by a bell-crank lever mounted on the machine frame and linked to the slotted lever-arm, the bell-crank lever having a tracking-roller which coacts with a carriage-rocking cam located at one side of the machine frame and fitted to a common primary cam-shaft geared for rotation by a main drive shaft on the machine, said transverse carriage member having a tracking roller at one end fitted to slidingly traverse the slot of the slotted lever arm; the means for imparting reciprocating movement to the pair of slide-members comprises a pair of lever arms pivotally mounted opposite each other on the sides of the machine frame for backwards-and-forwards pivotal movement and linked to the pair of slide-members, the lever arms having tracking-rollers which coact with a pair of carriage-reciprocating cams located at the sides of the machine frame and fitted to a common primary cam-shaft geared for rotation by a main drive shaft on the machine; and the means for imparting reciprocal turning movement to each of the spindles carrying the blade members comprises a channel member carried by lever arms mounted on the side of the machine frame for pivotal inwards-and-outwards movement, said lever arms having a tracking roller which coacts with a blade-turning cam located at one side of the machine frame and fitted to a common primary cam-shaft geared for rotation by a main drive shaft on the machine, the transverse carriage member having a reciprocating toothed rack engaging with toothed pinions carried by said spindles and said toothed rack having a roller tracking in said channel member.

7. A machine as defined in claim 6, in combination with cutout means operative to prevent rocking movement of the transverse carriage member and reciprocal turning movement of the spindles carrying the pancake slicing and lifting blade members.

8. A machine as defined in claim 7, in which said cut-out means comprises pivoted lever and link means mounted on the machine frame and disposed between the upper and lower stretches of the hot-plates, said lever and link means being connected to a hand lever pivotally mounted to upstand on one side of the machine frame.

9. A machine for cooking pancakes and the like hot-plate goods, comprising in combination an endless conveyor system supported by a frame and embodying an endless series of hot-plates in side-by-side relationship and disposed to form upper and lower substantially horizontal stretches of hot-plates; means operative to move the endless conveyor and hot-plates assembly intermittently; means for heating the hot-plates; means located near the leading end of the endless conveyor and hot-plates assembly to deposit measured quantities of pancake batter on each hot-plate in a transverse row relative to the travel direction of the hot-plates; pancake-turnover means comprising a travelling carriage located transversely above the upper stretch of hot-plates at a suitable point intermediate the length of the endless conveyor and hot-plates assembly and mounted pivotally to rock on a pair of reciprocating slide-member supported at the sides of the machine frame, a transverse battery of pancake-turnover slicing and lifting blades supported by said carriage and disposed to face said leading end of the endless conveyor and comprising a row of blade members carried by a row of spindles mounted for axial reciprocal turning movement on the transverse carriage member, and operative means comprising means for imparting rocking movement to said transverse carriage member, means for imparting reciprocating movement to said slide-members, and means for imparting reciprocal turning movement to each of the spindles carrying the row of blade members, all operative in timed relationship with the intermittent movement of each hot-plate to move said travelling carriage and blades from an elevated neutral position and in a direction opposite to the travel direction of the hot-plates and lower said blades into slicing engagement with a hot-plated located immediately beneath said blades in said lowered position and load the partly cooked pancakes from said hot-plate onto said blades, thence raise said blades, thence retract the travelling carriage and turn the blades over sidewardly to deposit the pancakes with the uncooked side downwards on said hot-plate and return said travelling carriage and blades to the elevated neutral position, said pancake-turnover operative means being operative to repeat the cycle of movements coincidental with the intermittent movement of each successive hot-plate; and pancake discharge means comprising a transverse battery of pancake-discharge slicing and lifting blades located above the upper stretch of the hot-plates near the trailing end of the endless conveyor and hot-plates assembly, and means operative in timed relationship with the intermittent movement of each hot-plate to move said blades from a neutral position and in a direction opposite to the travel direction of said hot-plates into slicing engagement with a hot-plate located immediately beneath said blades in a forward position and load cooked pancakes from said hot-plate onto said blades, thence turnover backwards whilst returning to the neutral position and discharge the pancakes from the machine, said pancake-discharge operative means being operative to repeat said movements coincidental with the intermittent movement of each successive hot-plate.

10. A machine as defined in claim 9, in which said pancake-discharge means comprises a row of blade members fixed to a traveling transverse shaft located above the upper stretch of hot-plates near the trailing end of the endless conveyor and hot-plates assembly, means for imparting reciprocating movement to the assembly of blade members and transverse shaft, and means for imparting axial reciprocal turning movement to said shaft, both in timed relationship.

11. A machine as defined in claim 10, in which the traveling transverse shaft is carried by a pair of bearing members slidably fitted to a pair of slide-blocks disposed opposite each other on the sides of the machine frame, said means for imparting reciprocating movement to the assembly of blade members and transverse shaft comprising a pair of lever arms mounted on the machine frame for pivotal backwards-and-forwards movement and linked to the bearing members and having a tracking roller which coacts with a shaft-reciprocating cam located at the trailing end of the machine frame and fitted to a common secondary cam-shaft geared for rotation by the machine drive means.

12. A machine as defined in claim 10, in which the traveling transverse shaft is carried by a pair of bearing members slidably fitted to a pair of slide-blocks disposed opposite each other on the sides of the machine frame, said means for imparting axial reciprocal turning movement to the shaft comprising a reciprocating toothed rack fitted to one of the slide-blocks and housed by one of the bearing members for sliding movement through the bearing housing, said transverse shaft having a toothed pinion which coacts with the reciprocating rack for reciprocal axial turning of the shaft, and a pair of lever arms mounted on the machine frame for pivotal backwards-and-forwards movement and having a tracking roller which coacts with a rack-reciprocating cam located at the trailing end of the machine frame and fitted to a common secondary cam-shaft geared for rotation by the machine drive means.

13. A machine as defined in claim 10, in which the pancake-discharge operative means for imparting said movements to the traveling transverse shaft and blade members comprises individual assemblies of lever and link means mounted at the trailing end of the machine and adapted to coact with cams carried by a common secondary cam-shaft geared for rotation by the machine drive means, the traveling transverse shaft being carried by a pair of bearing members slidably fitted to a pair of slide-blocks disposed opposite each other on the sides of the machine frame, said means for imparting reciprocating movement to the assembly of blade members and transverse shaft comprising a pair of lever arms mounted on the machine frame for pivotal backwards-and-forwards movement and linked to the bearing members and having a tracking roller which coacts with a shaft-reciprocating cam located at the trailing end of the machine frame and fitted to a common secondary cam-shaft geared for rotation by the machine drive means, and said means for imparting axial reciprocal turning movement to the shaft comprising a reciprocating toothed rack fitted to one of the slide-blocks and housed by one of the bearing members for sliding movement through the bearing housing, said transverse shaft having a toothed pinion which coacts with the reciprocating rack for reciprocal axial turning of the shaft, and a pair of lever arms mounted on the machine frame for pivotal backwards-and-forwards movement and having a tracking roller which coacts with a rack-reciprocating cam located at the trailing end of the machine frame and fitted to a common secondary cam-shaft geared for rotation by the machine drive means.

14. A machine as defined in claim 9, in combination with cutout means operative to prevent rocking movement of the transverse carriage member and reciprocal turning movement of the spindles carrying the pancake-turnover slicing and lifting blade members.

15. A machine as defined in claim 9, in which the means for imparting rocking movement to said transverse carriage member comprises a slotted lever-arm mounted on the machine frame for pivotal up-and-down movement by a bell-crank lever mounted on the machine frame and linked to the slotted lever-arm, the bell-crank lever having a tracking-roller which coacts with a carriage-rocking cam located at one side of the machine frame and fitted to a common primary cam-shaft geared for rotation by a main drive shaft on the machine, said transverse carriage member having a tracking roller at one end fitted to slidingly traverse the slot of the slotted lever arm.

16. A machine as defined in claim 9, in which the means for imparting reciprocating movement to the pair of slide-members comprises a pair of lever arms pivotally mounted opposite each other on the sides of the machine frame for backwards-and-forwards pivotal movement and linked to the pair of slide-members, the lever arms having tracking-rollers which coact with a pair of carriage-reciprocating cams located at the sides of the machine frame and fitted to a common primary cam-shaft geared for rotation by a main drive shaft on the machine.

17. A machine as defined in claim 9, in which the means for imparting reciprocal turning movement to each of the spindles carrying the blade members comprises a channel member carried by lever arms mounted on the side of the machine frame for pivotal inwards-and-outwards movement, said lever arms having a tracking roller which coacts with a blade-turning cam located at one side of the machine frame and fitted to a common primary cam-shaft geared for rotation by a main drive shaft on the machine, the transverse carriage member having a reciprocating toothed rack engaging with toothed pinions carried by said spindles and said toothed rack having a roller tracking in said channel member.

18. A machine as defined in claim 9, in which the operative means imparting the various movements to the traveling carriage and pancake-turnover slicing and lifting blades comprises individual assemblies of lever and link mechanism mounted on the sides of the machine frame to coact with cams carried by a common primary cam-shaft geared for rotation by a main drive shaft on the machine; the means for imparting rocking movement to said transverse carriage member comprises a slotted lever-arm mounted on the machine frame for pivotal up-and-down movement by a bell-crank lever mounted on the machine frame and linked to the slotted lever-arm, the bell-crank lever having a tracking-roller which coacts with a carriage-rocking cam located at one side of the machine frame and fitted to a common primary cam-shaft geared for rotation by a main drive shaft on the machine, said transverse carriage member having a tracking roller at one end fitted to slidingly traverse the slot of the slotted lever arm; the means for imparting reciprocating movement to the pair of slide-members comprises a pair of lever arms pivotally mounted opposite each other on the sides of the machine frame for backwards-and-forwards pivotal movement and linked to the pair of slide-members, the lever arms having tracking-rollers which coact with a pair of carriage-reciprocating cams located at the sides of the machine frame and fitted to a common primary cam-shaft geared for rotation by a main drive shaft on the machine; and the means for imparting reciprocal turning movement to each of the spindles carrying the blade members comprises a channel member carried by lever arms mounted on the side of the machine frame for pivotal inwards-and-outwards movement, said lever arms having a tracking roller which coacts with a blade-turning cam located at one side of the machine frame and fitted to a common primary cam-shaft geared for rotation by a main drive shaft on the machine, the transverse carriage member having a reciprocating toothed rack engaging with toothed pinions carried by said spindles and said toothed rack having a roller tracking in said channel member.

19. A machine as defined in claim 18, in combination with cut-out means operative to prevent rocking movement of the transverse carriage member and reciprocal turning movement of the spindles carrying the pancake-turnover slicing and lifting blade members.

20. A machine as defined in claim 19, in which said cut-out means comprises pivoted lever and link means mounted on the machine frame and disposed between the upper and lower stretches of the hot-plates, said lever and link means being connected to a hand lever pivotally mounted to upstand on one side of the machine frame.

21. A machine for cooking pancakes and like hot-plate goods, comprising in combination an endless conveyor system supported by a frame and embodying an endless of hot-plates in side-by-side relationship and disposed to form upper and lower substantially horizontal stretches of hot-plates; means operative to move the endless conveyor and hot-plates assembly intermittently; means for heating the hot-plates; means located near the leading end of the endless conveyor and hot-plates assembly to deposit measured quantities of pancake batter on each hot-plate in a transverse row relative to the travel direction of the hot-plates; pancake-turnover means comprising a travelling carriage located transversely above the upper stretch of hot-plates at a suitable point intermediate the length of the endless conveyor and hot-plates assembly and mounted pivotally to rock on a pair of reciprocating slide-members supported at the sides of the machine frame, a transverse battery of pancake-turnover slicing and lifting blades supported by said carriage and disposed to face said leading end of the endless conveyor and comprising a row of blade members carried by a row of spindles mounted for axial reciprocal turning movement on the transverse carriage member, and operative means comprising means for imparting rocking movement to said transverse carriage member, means for imparting reciprocating movement to said slide-members, and means for imparting reciprocal turning movement to each of the spindles carrying the row of blade members, all operative in timed relationship with the intermittent movement of each hot-plate to move said travelling carriage and blades from an elevated neutral position and in a direction opposite to the travel direction of the hot-plates and lower said blades into slicing engagement with a hot-plate located immediately beneath said blades in said lowered position and load the partly cooked pancakes from said hot-plate onto said blades, then raise said blades, thence retract the traveling carriage and turn the blades over sidewardly to deposit the pancakes with the uncooked side downwards on said hot-plate and return said travelling carriage and blades to the elevated neutral position, said pancake-turnover operative means being operative to repeat the cycle of movements coincidental with the intermittent movement of each successive hot-plate; pancake discharge means comprising a transverse battery of pancake-discharge slicing and lifting blades located above the upper stretch of the hot-plates near the trailing end of the endless conveyor and hot-plates assembly, and means operative in timed relationship with the intermittent movement of each hot-plate to move said blades from a neutral position and in a direction opposite to the travel direction of said hot-plates into slicing engagement with a hot-plate located immediately beneath said blades in a forward position and load cooked pancakes from said hot-plate onto said blades, thence turnover backwards whilst returning to the neutral position and discharge the pancakes from the machine, said pancake-discharge operative means being operative to repeat said movements coincidental with the intermittent movement of each successive ot-plate; and hot-plate cleaning and oiling means beneath the endless conveyor and hot-plates assembly and located for engagement with the cooking face of the hot-plates in the lower substantially horizontal stretch to clean debris from the cooking face of the hot-plates and spread cooking oil across said cooking face of the hot-plates.

22. A machine as defined in claim 21, in which the hot-plate cleaning and oiling means comprises a transversely disposed rotary brush adapted to rotate in a direction linearly opposite to the travel direction of the hot-plates for cleaning debris from each hot-plate, a strip-form rotary brush adapted to contact and apply oil to each hot-plate, a bank of spring-loaded rotary brushes in staggered relationship and with the brush diameters overlapping, and means for rotating said brushes.

23. A machine as defined in claim 22, in which the strip-form brush is mounted for rotation in a trough forming a cooking-oil reservoir and supported on the machine frame for raising or lowering, and hand operative means to raise or lower said trough.

24. A machine as defined in claim 22, in which the bank of spring-loaded rotary brushes is carried by a suspension beam mounted on the machine frame for raising or lowering, and hand-operative means to raise or lower said beam.

25. A machine as defined in claim 21, in combination with cut-out means operative to prevent rocking movement of the transverse carriage member and reciprocal turning movement of the spindles carrying the pancake-turnover slicing and lifting blade members.

26. A machine as defined in claim 21, in which the means for imparting rocking movement to said transverse carriage member comprises a slotted lever-arm mounted on the machine frame for pivotal up-and-down movement by a bell-crank lever mounted on the machine frame and linked to the slotted lever-arm, the bell-crank lever having a tracking-roller which coacts with a carriage-rocking cam located at one side of the machine frame and fitted to a common primary cam-shaft geared for rotation by a main drive shaft on the machine, said transverse carriage member having a tracking roller at one end fitted to slidingly traverse the slot of the slotted lever arm.

27. A machine as defined in claim 21, in which the means for imparting reciprocating movement to the pair of slide-members comprises a pair of lever arms pivotally mounted opposite each other on the sides of the machine frame for backwards-and-forwards pivotal movement and linked to the pair of slide-members, the lever arms having tracking-rollers which coact with a pair of carriage-reciprocating cams located at the sides of the machine frame and fitted to a common primary cam-shaft geared for rotation by a main drive shaft on the machine.

28. A machine as defined in claim 21, in which the means for imparting reciprocal turning movement to each of the spindles carrying the blade members comprises a channel member carried by lever arms mounted on the side of the machine frame for pivotal inwards-and-outwards movement, said lever arms having a tracking roller which coacts with a blade-turning cam located at one side of the machine frame and fitted to a common primary cam-shaft geared for rotation by a main drive shaft on the machine, the transverse carriage member having a reciprocating toothed rack engaging with toothed pinions carried by said spindles and said toothed rack having a roller tracking in said channel member.

29. A machine as defined in claim 21, in which the operative means imparting the various movements to the travelling carriage and pancake-turnover slicing and lifting blades comprises individual assemblies of lever and link mechanism mounted on the sides of the machine frame to coact with cams carried by a common primary cam-shaft geared for rotation by a main drive shaft on the machine; the means for imparting rocking movement to said transverse carriage member comprises a slotted lever-arm mounted on the machine frame for pivotal up-and-down movement by a bell-crank lever mounted on the machine frame and linked to the slotted lever-arm, the bell-crank lever having a tracking-roller which coacts with a carriage-rocking cam located at one side of the machine frame and fitted to a common primary cam-shaft geared for rotation by a main drive shaft on the machine, said transverse carriage member having a tracking roller at one end fitted to slidingly traverse the slot of the slotted lever arm; the means for imparting reciprocating movement to the pair of slide-members comprises a pair of lever arms pivotally mounted opposite each other on the sides of the machine frame for backwards-and-forwards pivotal movement and linked to the pair of slide-members, the lever arms having tracking-rollers which coact with a pair of carriage-reciprocating cams located at the sides of the machine frame and fitted to a common primary cam-shaft geared for rotation by a main drive shaft on the machine; and the means for imparting reciprocal turning movement to each of the spindles carrying the blade members comprises a channel member carried by lever arms mounted on the side of the machine frame for pivotal inwards-and-outwards movement, said lever arms having a tracking roller which coacts with a blade-turning cam located at one side of the machine frame and fitted to a common primary cam-shaft geared for rotation by a main drive shaft on the machine, the transverse carriage member having a reciprocating toothed rack engaging with toothed pinions carried by said spindles and said toothed rack having a roller tracking in said channel member.

30. A machine as defined in claim 29, in combination with cutout means operative to prevent rocking movement of the transverse carriage member and reciprocal turning movement of the spindles carrying the pancake-turnover slicing and lifting blade members.

31. A machine as defined in claim 30, in which said cutout means comprises pivoted lever and link means mounted on the machine frame and disposed between the upper and lower stretches of the hot-plates, said lever and link means being connected to a hand lever pivotally mounted to upstand on one side of the machine frame.

32. A machine as defined in claim 21, in which said pancake-discharge means comprises a row of blade members fixed to a travelling transverse shaft located above the upper stretch of hot-plates near the trailing end of the endless conveyor and hot-plates assembly, means for imparting reciprocating movement to the assembly of blade members and transverse shaft, and means for imparting axial reciprocal turning movement to said shaft, both in timed relationship.

33. A machine as defined in claim 32, in which the travelling transverse shaft is carried by a pair of bearing members slidably fitted to a pair of slide-blocks disposed opposite each other on the sides of the machine frame, said means for imparting reciprocating movement to the assembly of blade members and transverse shaft comprising a pair of lever arms mounted on the machine frame for pivotal backwards-and-forwards movement and linked to the bearing members and having a tracking roller which coacts with a shaft-reciprocating cam located at the trailing end of the machine frame and fitted to a common secondary cam-shaft geared for rotation by the machine drive means.

34. A machine as defined in claim 32, in which the travelling transverse shaft is carried by a pair of bearing members slidably fitted to a pair of slide-blocks disposed opposite each other on the sides of the machine frame, said means for imparting axial reciprocal turning movement to the shaft comprising a reciprocating toothed rack fitted to one of the slide-blocks and housed by one of the bearing members for sliding movement through the bearing housing, said transverse shaft having a toothed pinion which coacts with the reciprocating rack for reciprocal axial turning of the shaft, and a pair of lever arms mounted on the machine frame for pivotal backwards-and-forwards movement and having a tracking roller which coacts with a rack-reciprocating cam located at the trailing end of the machine frame and fitted to a common secondary cam-shaft geared for rotation by the machine drive means.

35. A machine as defined in claim 32, in which the pancake-discharge operative means for imparting said movements to the travelling transverse shaft and blade members comprises individual assemblies of lever and link means mounted at the trailing end of the machine and adapted to coact with cams carried by a common secondary cam-shaft geared for rotation by the machine drive means, the travelling transverse shaft being carried by a pair of bearing members slidably fitted to a pair of slide-blocks disposed opposite each other on the sides of the machine frame, said means for imparting reciprocating movement to the assembly of blade members and transverse shaft comprising a pair of lever arms mounted on the machine frame for pivotal backwards-and-forwards movement and linked to the bearing members and having a tracking roller which coacts with a shaft-reciprocating cam located at the trailing end of the machine frame and fitted to a common secondary cam-shaft geared for rotation by the machine drive means, and said means for imparting axial reciprocal turning movement to the shaft comprising a reciprocating toothed rack fitted to one of the slide-blocks and housed by one of the bearing members for sliding movement through the bearing housing, said transverse shaft having a toothed pinion which coacts with the reciprocating rack for reciprocal axial turning of the shaft, and a pair of lever arms mounted on the machine frame for pivotal backwards-and-forwards movement and having a tracking roller which coacts with a rack-reciprocating cam located at the trailing end of the machine frame and fitted to a common secondary cam-shaft geared for rotation by the machine drive means.

References Cited in the file of this patent

UNITED STATES PATENTS

| Re. 19,685 | Brand | Sept. 3, 1935 |
| 1,847,752 | Coleman | Mar. 1, 1932 |
| 2,542,265 | Staples | Feb. 20, 1951 |
| 2,571,373 | Massecar | Oct. 16, 1951 |
| 2,786,430 | Robbins | Mar. 26, 1957 |
| 2,899,914 | Van Arsdell | Aug. 18, 1959 |
| 2,962,985 | Cartronuovo | Dec. 6, 1960 |

FOREIGN PATENTS

| 329,362 | Great Britain | May 19, 1930 |
| 104,139 | Sweden | Mar. 31, 1942 |
| 321,805 | Great Britain | Nov. 21, 1959 |